United States Patent [19]
Bergmann

[11] Patent Number: 6,040,942
[45] Date of Patent: Mar. 21, 2000

[54] POLARIZATION SEPARATOR/COMBINER

[75] Inventor: Ernest Eisenhardt Bergmann, Fountain Hill, Pa.

[73] Assignee: Lucent Technologies, Inc., Murray Hill, N.J.

[21] Appl. No.: 08/899,581

[22] Filed: Jul. 24, 1997

[51] Int. Cl.[7] .................................................. G02B 5/30
[52] U.S. Cl. ......................................... 359/487; 359/483
[58] Field of Search ................................... 359/583, 387, 359/394, 395, 396, 833, 834, 837, 487, 488, 495, 496, 483, 485

[56] References Cited

U.S. PATENT DOCUMENTS

| | | | |
|---|---|---|---|
| 4,556,292 | 12/1985 | Mathyssek et al. | 359/487 |
| 4,659,185 | 4/1987 | Aughton | 359/487 |
| 4,836,678 | 6/1989 | Okaji | 356/351 |
| 4,863,246 | 9/1989 | Anthon | 359/583 |
| 5,657,164 | 8/1997 | Shuman | 359/583 |

OTHER PUBLICATIONS

Blanc, D. et al, "The Design, Preparation and Optical Measurement of Thin film Poliarizers", Thin Solid Films, 57 pp. 191–198(1979).
Fowles, Grant R., Introduction to Modern Optics, Second Edition, Holt, Rhinehart & Wilson, (1975) p. 184.
Klocek, Paul ed., Handbook of Infrared Optical Materials, pp. 524532.
Koga, M. et al, "Multi/Demultiplexer Using a 4–port Optical Circulator and Interference Filters", Transactions of the IEICE, vol. E72, No. 10, pp. 1086–1088, Oct. 1989.
Macleod, H.A., Thin–film Optical Filters, Second Edition, McGraw–Hill (pp. 314–356).
Songer, L., "The Design and Fabrication of a Thin Film Polarizer", Optical Spectra, Oct. 1978, pp. 49–50.
Spectra, Inc., World–Wide Web pages on TRDalc 3.1, Portland, Orgon, http://www.sspectra.com/.

*Primary Examiner*—Cassandra Spyrou
*Assistant Examiner*—Jared Treas

[57] ABSTRACT

A polarization separator/combiner for separating a light beam having two orthogonally polarized components into two parallel orthogonally polarized light beams which is especially useful as a reflective substitute for conventional walk-off devices or other birefringent separator/combiners. The light beam passes through a polarizing interface which reflects one component of the light and transmits the other, which is reflected off a parallel reflective interface and passes back through the polarizing interface to emerge parallel to the reflected component. A first embodiment of the invention comprises a flat plate having a coating on the front surface which reflects substantially all of one of the components of the light beam, while transmitting substantially all of the orthogonally polarized component. The transmitted component is reflected from the rear surface of the plate (either by internal reflection or by application of a reflective coating), and emerges from the front surface of the plate parallel to the orthogonally polarized component. With proper choice of material for the plate, the dielectric coating may be omitted. In other embodiments as walk-off devices, an upper parallelogram- or trapezoid-shaped element refracts the incoming beam, either upward toward its upper surface from which it reflects downward or directly downward, toward a polarizing interface on the lower surface of the element. One component of the beam is reflected from the interface, while the other orthogonally polarized component passes through, is reflected off a reflecting surface parallel to the lower surface of the element, and passes back through the interface into the element. Both beams then emerge from the upper element, refracted to become parallel to the incoming beam.

10 Claims, 4 Drawing Sheets

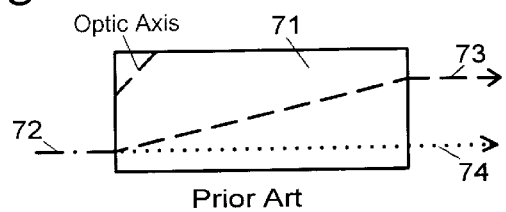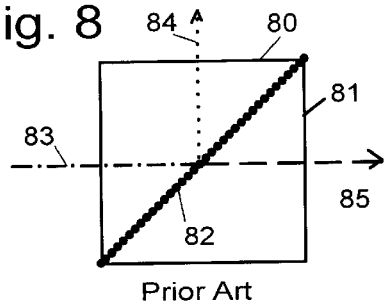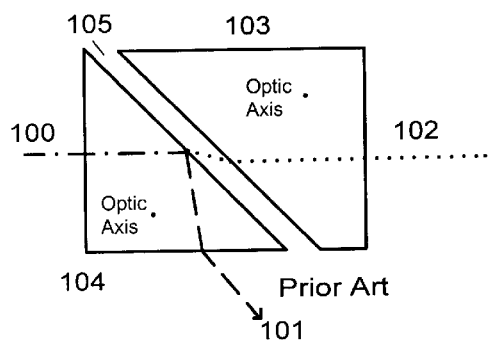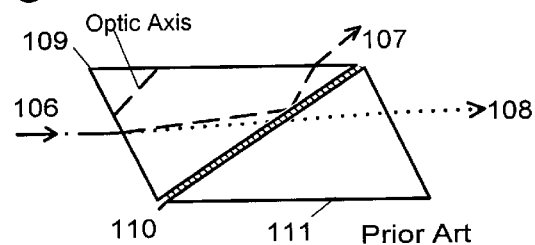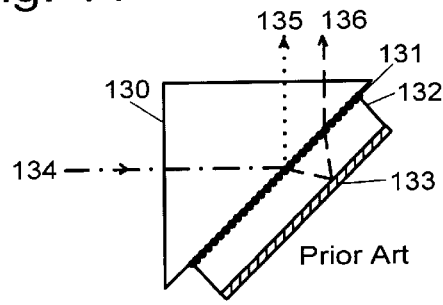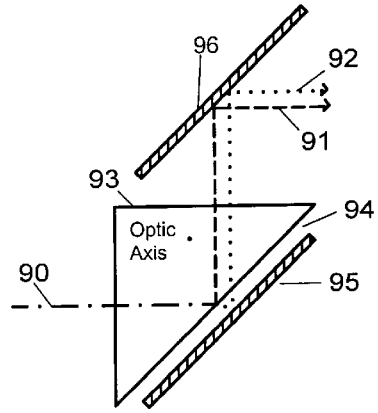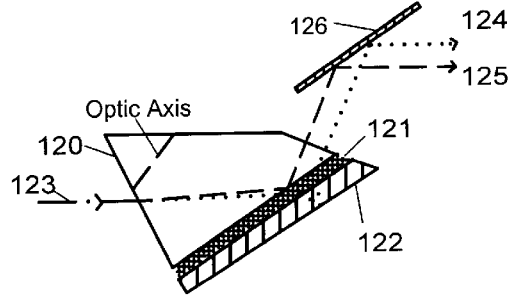

POLARIZATION SEPARATOR/COMBINER

FIELD OF THE INVENTION

The invention pertains to the field of optical devices. More particularly, the invention pertains to optical devices useful in communications applications.

BACKGROUND OF THE INVENTION

It is often necessary to separate a light beam into its orthogonally polarized components. These components are usually termed "P-polarized" ("P" for parallel) and "S-polarized" ("S" for "senkrecht") with regard to tilted interfaces between two isotropic media, or, alternatively, "O-polarized" ("O" for "ordinary") and "E-polarized" ("E" for "extraordinary") with regard to uniaxial optical materials (typically crystals). Devices which separate light into components of differing polarization are termed "polarization separators", "polarizers" or "beam splitters". Separators can be used as combiners, to combine separately polarized beams into a beam of mixed polarization (i.e. a beam having components of varying polarization).

For the purposes of this disclosure, the following definitions should be noted:

A walk-off plate is a slab of birefringent material with entering and exit surfaces mutually parallel. The optic axis is not parallel nor perpendicular to these surfaces. Light entering is separated into two paths, depending on polarization. On exit, the two possible paths are re-refracted parallel to the initial, entering direction, hence mutually parallel, but displaced from one another.

A walk-off device is any means to separate polarizations into parallel, displaced beams. Examples of walk-off devices are a single, or several cascaded, walk-off plates, and also the various embodiments of the present invention.

FIGS. 7 through 11 show a number of the various prior-art devices for polarization separation: a walk-off plate (FIG. 7), polarization cube (FIG. 8), Glan prism (FIG. 9) and Nicol prism (FIG. 10). There are other prism designs, not shown, such as Wollaston, Rochon or Senarmont prisms, which differ among the group in the direction and amount of beam deflection, but which are similar in concept to the tilted interface between uniaxial media of FIGS. 9 and 10.

FIG. 11 shows a polarization cube using a polarizing interface (polarization beam coating), as taught by Asanuma, Japanese patent application no. 2-168204(A), FIG. 4 (published Jun. 28, 1990). A glass prism (130) has a glass plate (132) attached, with the polarization beam coating (131) between. The incoming beam (134) is split at the polarization beam coating (131), with one component of light (135) being reflected by the interface, and the other (136) passing through the interface (131) into the plate (132). The beam is reflected off the rear surface (133) of the plate, and then passes back through the prism (130) and exits parallel to the other beam (135). For clarity, it should be noted that in the drawings, the dashed line represents a beam of a particular polarization, the dotted line represents the orthogonally polarized beam, and the alternately dashed-dotted line represents a beam of mixed polarization (viz. unpolarized, polarized but not of said particular polarization nor orthogonal to it, or partially polarized).

As shown in FIGS. 8 through 10, most of the prior-art polarization separators resulted in at least one of the polarized light paths being sent off at an angle from the incoming light, the two polarized beams are not mutually parallel.

Uniaxial materials are made of specific substances which are characterized by having a unique axis of optical symmetry, called the optical axis, which imposes constraints upon the propagation of light beams within the crystal. Two polarization modes are permitted, either as an ordinary ("O-polarized") beam polarized normal to the optic axis, or as an extraordinary ("E-polarized") beam polarized in a plane containing the optic axis and the direction of propagation. Each of the beams' polarization has a different associated refractive index. It is this polarization dependent refractive index that enables suitably cut and oriented prisms of birefringent materials to act as polarizers and polarizing beam splitters. Birefringent materials commonly used include calcite, rutile, crystal quartz, ammonium dihydrogen phosphate and magnesium fluoride.

If it is required that the separated light paths should be parallel, then the prior art device of choice was the "walk-off" plate made of linear birefringent material shown in FIG. 7. In a walk-off device (71), the incoming beam (72) is split into two orthogonally polarized beams by the birefringent nature of the crystal. The angle of one of the refracted beams obeys Snell's law; that beam is termed "O-polarized". The E-polarized beam (73) is refracted away from the path of the incoming beam (72), and yet exits parallel to the O-polarized beam (74) which is refracted according to Snell's law.

Each of the various birefringent materials have associated problems, including brittleness, softness, expense, hygroscopic effects, and so on. It is desirable, therefore, to find a substitute for the walk-off plate and other polarization separators which achieves the result without the associated problems. It is also desirable to work with parallel, orthogonally polarized beams, such as with the walk-off plate. In this specification, such novel devices with parallel beams will be termed "walk-off devices", as a generalization of the "walk-off plate".

Referring to FIG. 2, a slab of isotropic, transparent material (10) is shown, with its surface (11) having known characteristics or a specific coating. Two beams of light (14) and (15) of orthogonal polarization are shown striking the surface coating (11) at an oblique angle θ to the perpendicular (12). Here, the "P-polarized" beam (14) is shown dashed, and the "S-polarized" (15) beam is dotted. As each beam strikes the surface, some of each beam is transmitted, and some is reflected. The transmitted portion is shown as "T", and the reflected portion as "R", with the subscript showing the polarization of the beam ("$T_s$"). T and R are "fractional powers"—that is, they take on values between 0% and 100%. The transmitted beams $T_s$ and $T_p$ are refracted at an angle φ, as they enter the surface of the material. The relationship of θ and φ is given by Snell's Law:

$$n_{air} \sin \theta = n_{material} \sin \phi$$

For purposes of illustration, air is assumed for the incident medium; more generally, other incident media can be considered.

If there is no absorption at the coating or surface, then by power conservation, T+R=100%, specifically $T_p+R_p=100\%$ and $T_s+R_s=100\%$.

SUMMARY OF THE INVENTION

In its simplest form, the invention presents a reflective substitute for a walk-off plate using a polarizing planar interface on the surface of a transparent plate, where one polarization is substantially transmitted through the interface, and the orthogonal polarization is substantially reflected.

The beam to be split hits the polarizing interface at an oblique angle. Light of a first polarization is reflected off the interface, while the orthogonally polarized light passes through the interface and is bent by the refraction of the material. A reflecting surface, located on the opposite side of the plate from the polarizing interface, acts to reflect the transmitted beam back through the transparent plate, from which it emerges parallel to the reflected beam of the first polarization.

Additional reflective surfaces, or reflective/refractive plates, may be added to increase the differentiation and redirect the light beams. The invention may be generalized to provide reflective substitutes for each of the various birefringent beam splitters/combiners shown in FIGS. 8–10.

BRIEF DESCRIPTION OF THE DRAWING

FIG. 7 shows a prior-art birefringent walk-off plate polarization separator/combiner.

FIG. 8 shows a prior-art polarization cube.

FIG. 9 shows a prior-art Glan-Thompson prism polarizer.

FIG. 10 shows a prior-art Nicol prism polarizer.

FIG. 11 shows a prior art device used in the manner of a polarizing cube.

FIG. 12 shows an embodiment of the invention used in the manner of a Glan-Thompson prism, with a reflective plate to direct the outgoing beams.

FIG. 13 shows an embodiment of the invention used in the manner of a Nicol prism, with a reflective plate to direct the outgoing beams.

DESCRIPTION OF THE PREFERRED EMBODIMENT

Figure 2:
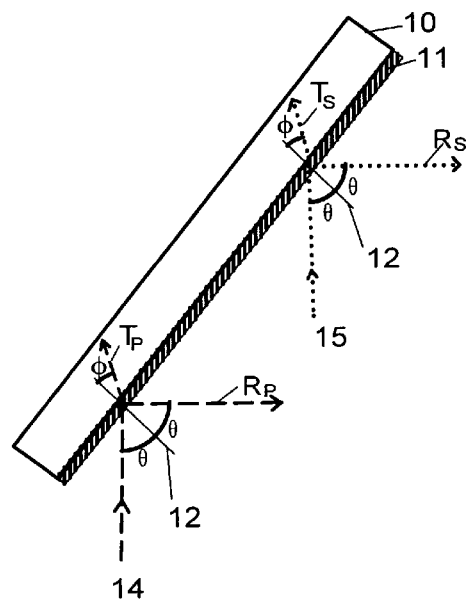
FIG. 2 shows a diagram of reflection and transmission angles.

Referring to FIG. 2 for the notation of the beams, for direct interfaces between isotropic media, there is a special angle $\theta$, called "Brewster's Angle" ($\theta_B$), defined as the angle at which $R_p=0$ and $T_p=1$. That is, for light striking the surface at an angle of $\theta_B$, all of the P-polarized light is transmitted through the surface, and none reflected. Ideally, for polarization separation, we would therefore like that $R_s \approx 1$, and $T_s \approx 0$ (at $\theta_B$), so that the "S" polarized light would be entirely reflected, and the "P" polarized light transmitted. This separation requirement would work if $n_{medium} \gg 1$.

For silicon, for light of wavelength $\lambda=1.5$ $\mu$m, the index $n_{medium} \approx 3.5$, so that $\theta_B \approx 74°$ and $R_s \approx 72\%$. If there were higher index materials available, then they could be used uncoated to accomplish the polarization separation of the invention. Otherwise, suitably chosen multiple dielectric coatings with large H/L ratios and large angles of incidence can be used to split polarizations over narrow wavelength bands (see *Handbook of Infrared Optical Materials*, Paul Klocek, ed., pp. 524–532).

Figure 3:
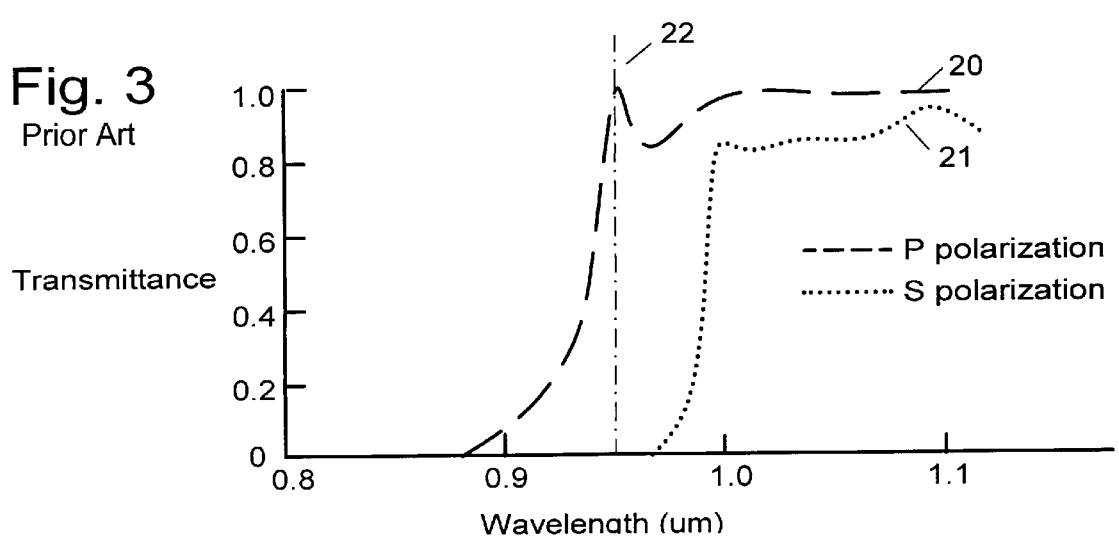
FIG. 3 shows a graph of transmittance vs. wavelength for P- and S-polarized light for a possible multilayer coating.

FIG. 3 shows a graph, from page 530 of Klocek, of the transmittance of S- (21) and P- (20) polarized light over a wavelength range of 0.8 $\mu$m to 1.21 $\mu$m for a given reflector stack. The lines shown are for coatings with air on one side—the differential is even greater with the coatings between glass plates. As can be seen from the graph, at a wavelength of approximately 0.95 $\mu$m (22) in this example, the transmittance of P-polarized light is approximately 1.0 (100% of light transmitted), and approximately 0 for S-polarized light.

By finding a good choice for $\theta$ (to make $R_p \approx 0$), and careful choice of coating (to make $R_s \approx 1$), we can get high polarization discrimination. This choice can be done by well-known principles, as expressed in Klocek, or Macleod *Thin-film Optical Filters* (pp. 314–356), and other references. Commercial software is available for calculating these factors, such as TFCalc 3.1, available from Software Spectra, Inc., Portland, Oreg.

Figure 1:
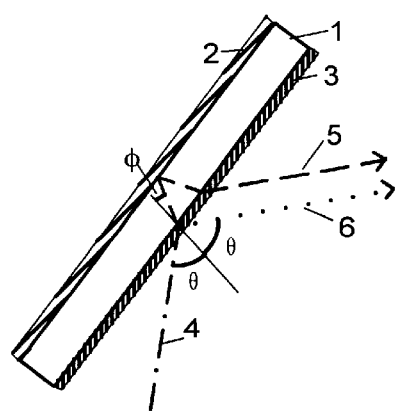
FIG. 1 shows a side view of the polarization separator/combiner of the invention.

FIG. 1 shows the basic polarization separator/combiner of the invention, in the form of a transparent plate (1) having a coating (3) on its front surface, selected so as to be polarization-selective, and a highly reflective coating (2) on its rear surface, arranged to separate an incoming light beam (4) into parallel outgoing S-polarized (6) and P-polarized (5) beams. The operation of the separator/combiner is as follows:

The incoming beam (4) strikes the surface or coating (3) at an oblique angle $\theta$ chosen as noted above so that $R_p$ is as close to 0 as possible. Assuming the index $n_{material}$ of the plate is not sufficiently high to make $R_s$ close to 1, a coating (3) is chosen as noted above to make $R_s$ as high as possible for maximum discrimination. The S-polarized portion of the incoming beam is reflected as beam (6). The P-polarized portion is refracted at an angle $\phi$ and transmitted into the plate. The P-polarized beam then strikes the rear surface of the plate (1) and is reflected back, being refracted again, and exits as beam (5) parallel to the S-polarized beam (6).

If the internal reflection of plate (1) is total, or nearly so, then no special treatment of the rear surface of the plate is necessary. Otherwise, a reflective coating (2) should be applied to the rear surface of the plate to maximize reflection. One cannot have total reflection at the rear surface unless the index of the rear medium is so much lower than the incident medium that the surrounding two media would directly provide total internal reflection. If the medium (air) is the same on both sides of the plate, then one does not have total internal reflection. It should be noted here that the physical separation of the emergent beams is related to the thickness of the plate (1), and, also to the values of $\theta$ and $\phi$.

Figure 4:
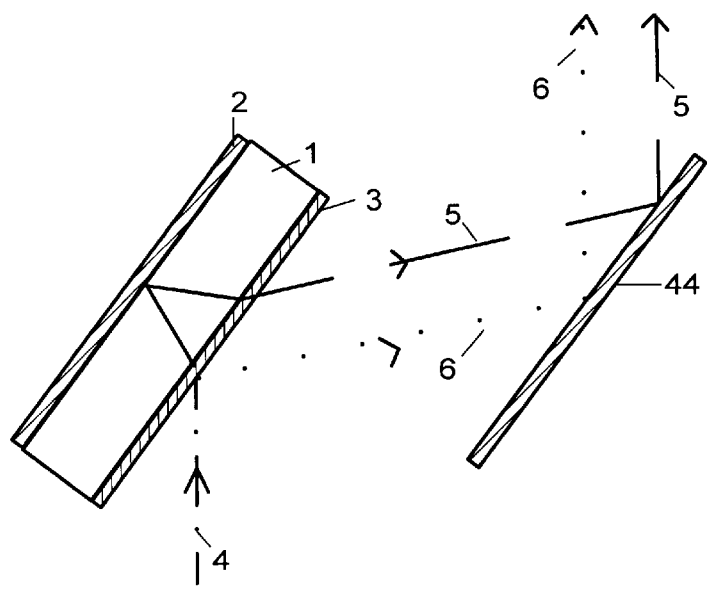
FIG. 4 shows an embodiment of the invention using a mirror to reflect the polarization-separated light parallel to the mixed polarized light.

FIG. 4 shows how the separator/combiner of the invention can be combined with a mirror (44) to emulate a straight transmission walk-off plate of the kind shown in FIG. 7. The P-polarized (5) and S-polarized (6) beams are reflected off a mirror (44), mounted parallel to the plate (1), so that the beams (5) and (6) emerge parallel to incoming beam (4). If the plate (1) and mirror (44) are held with a common orientation, the direction of the emergent beams is independent of the tilt of the common orientation. As illustrated, the mirror (44) follows the separator/combiner; it could have preceded the separator/combiner instead.

Figure 5:
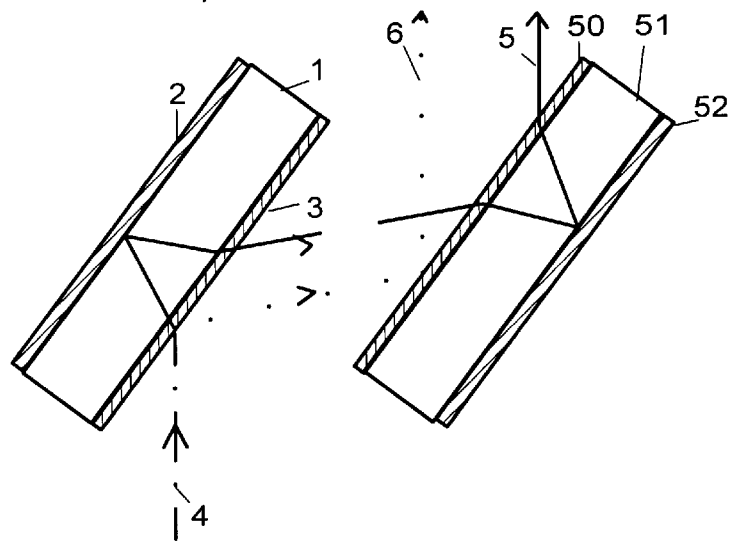
FIG. 5 shows an embodiment of the invention using a second polarization separator to reflect the polarization-separated light parallel to the combined input light.

In FIG. 5, instead of a mirror, a second polarization separator of the invention is shown, comprising plate (51) with front (50) and rear (52) coatings. With this arrangement, one can get the benefits of the mirror arrangement of FIG. 4, but with an increase of physical separation of the two beams. In addition, the second polarization separator will also add to the discrimination between the two orthogonal polarizations, with an increase in insertion losses.

Figure 6:
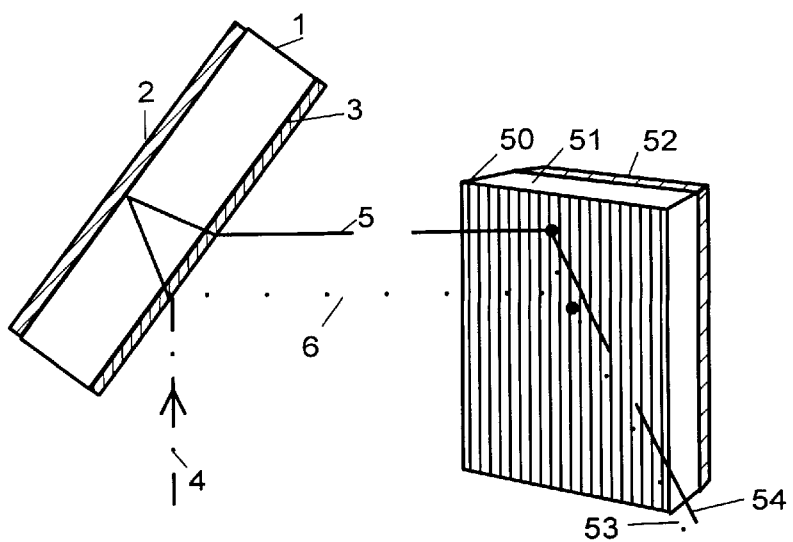
FIG. 6 shows an embodiment of the invention using a second polarization splitter/combiner at right angles rotated to equalize treatment of both paths.

In FIG. 6, the second polarization separator (50), (51) and (52) is mounted with a 90° twist. This arrangement has the S-polarized beam (6), which reflected from surface (3) of the first polarization separator, is effectively P-polarized with respect to the second polarization separator, and is refracted and transmitted into plate (51) of the second, and emerges from the paper toward the viewer as beam (53). Similarly, the P-polarized beam (5), which was refracted and transmitted through plate (1), is effectively S-polarized with respect to the second polarization separator, and is reflected from surface (50) and emerges from the paper as beam (54). This equalizes the insertion losses of the two beams, in that each is both transmitted and reflected by the two separators. Although the polarizations of beams (53) and (54) are mutually orthogonal, they are at 45° angles (assuming the same magnitude of walk-off for each plate) to the direction of final beam separation. This provides the opportunity of using a ±45° Faraday rotator to provide a walk-off match to another, more conventional walk-off arrangement, where the polarizations are parallel and perpendicular to the beam separation. Another advantage of this arrangement is to equalize Polarization Mode Dispersion (PMD), Polarization Dependent Loss (PDL) and polarization purity between the two beams. One disadvantage of this arrangement (relative to the arrangement of FIG. 5) is that the beam direction is sensitive to overall system tilt.

By attaching additional optical components and/or birefringent materials, other embodiments of the invention can be produced using the reflection principle to produce parallel orthogonally-polarized beams of light by redirecting a transmitted beam through the polarizing interface.

FIG. 8 shows a so-called "polarization cube", a prior art device. Two right-angle prisms (80) and (81), typically glass, are cemented together with a multi-layer dielectric coating (82) at the cemented interface. Light of one polarization (85) passes through the interface (82), while light of the other polarization (84) is reflected by the interface (82), emerging at right-angles to the incoming beam (83).

The two most common kinds of polarizing prisms, Glan-Thompson (FIG. 9) and Nicol (FIG. 10) can similarly be transformed using the invention.

Because of refraction between the uniaxial medium and the surrounding medium (i.e. air), care must be taken if one wants to preserve the parallelism of the two beams exiting the medium. Where the beams exit perpendicular to the optic axis, the exit interface should be normally incident by the beams. Alternatively, the angle of the emergent beams can be brought into parallelism by appropriate tilting of the mirror away from parallelism with the polarization interface.

When the optical axis is in the plane of the drawing, the exiting beams in the medium should be along (parallel to) the optic axis if one desires parallel polarized beams; one could tilt the mirror to achieve this parallelism instead.

Referring to FIG. 9, a Glan-Thompson polarizing prism has two half-prisms (104) and (103) made of birefringent material, separated by an air gap (105) which forms the polarizing interface. The incoming beam (100) is split at the surface of the first prism (104), with the P-polarized light (101) exiting from the side of the prism (104), and the S-polarized light beam (102) passing through the air gap (105) and the second prism (103) (or vice-versa, depending on whether one has positive or negative uniaxial material).

FIG. 12 shows the equivalent of the Glan-Thompson prism, using the invention. The birefringent prism (93) is separated from a reflective plate (95) by air gap (94). The incoming beam (90) is split at the interface of the surface of the prism (93) and the air gap (94), with one polarization (91) being reflected by the interface, and the orthogonally polarized light (92) passing through the interface. The orthogonally polarized beam (92) is reflected off the reflective plate (95), and then passes back through the prism (93) and exits parallel to the first polarized beam (91). Both beams are reflected off a reflective element (96) such as a mirror or reflective plate, to become more nearly parallel to the incoming beam (90).

FIG. 10 shows a Nicol prism. The Nicol prism has two birefringent prisms (109) and (111), attached together by a transparent adhesive substance such as Canada Balsam cement (110), which forms the polarizing interface. The incoming beam (106) is split at the interface (110), with one polarized beam (107) exiting from the side of the prism (109), and the orthogonally polarized beam (108) passing through the interface, being refracted, and exiting at an angle from the second prism (108).

FIG. 13 shows the equivalent of the Nicol prism using the invention. A plate (122) is attached to a birefringent half-prism of identical design to the conventional Nicol first prism (109) with transparent adhesive such as Canada Balsam (121), as in the conventional Nicol. The incoming beam (123) is split at the interface (121), with one polarized beam (124) exiting the side of the prism (120) at an angle, and the orthogonally polarized beam (125) passing through the interface (121). Beam (125) is then refracted into the plate (122), and reflects off the rear surface of (122) through total internal reflection (or, if desired by use of a reflective coating shown in other figures). It exits back through the prism (120), parallel to the first beam (124), and both beams are reflected off reflective surface (126) to become parallel to the incoming beam (123).

Figure 14:
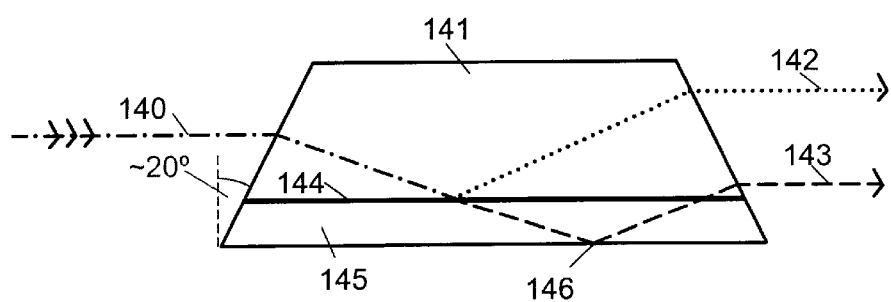
FIG. 14 shows an embodiment of the invention used in the manner of a walk-off plate.
Figure 15:
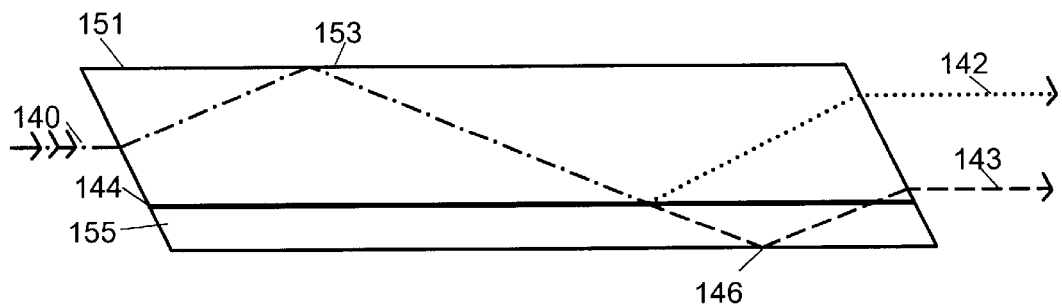
FIG. 15 shows another embodiment of the invention used in the manner of a walk-off plate.

FIGS. 14 and 15 show embodiments of the invention which may be used as replacements for prior-art walk-off plates. These embodiments use refraction at the initial and final interfaces to bring the incoming and outgoing beams more or less in line, total internal reflection for all reflections other than due to the polarization separating interface, and use a "sandwiched" polarization separation coating analogous to FIGS. 8 and 11.

In both embodiments, the apparatus of the invention comprises an upper (141) or (153) section and a lower (145) or (155) section, with a polarization separating interface (144) sandwiched between. The interface (144) is a layered coating, as described in the other embodiments of the invention, above. The upper and lower halves of the apparatus are preferably made of glass (n=1.5 or greater), with the ends tilted relative to the axis of the apparatus. In the example shown, the tilt is approximately 20°. The apparatus of this embodiment could be shortened if glass with greater "n" or other substance were used, or if the tilt of the ends were increased more than shown.

Referring to the FIG. 14 embodiment, the incoming beam of mixed polarization (140) enters the upper portion (141) and is refracted downward toward the polarizing interface (144). At the interface (144) the beam is split into two differently polarized beams (142) and (143). One beam (142) reflects off the interface (144) and is bent by refraction as it leaves the upper portion (141). The other beam (143) passes through the interface (144), reflects off the bottom (146) of the lower portion (145) by total internal reflection, passes again through the interface (144), and exits from the upper portion (141), being bent by refraction as it leaves.

In the embodiment of FIG. 15, the same arrangement of elements is used, except that the upper (151) and lower (155) portions are longer (about twice as long as in FIG. 14) and the ends are tilted in differently from the embodiment of FIG. 14, in that the ends in FIG. 15 are parallel (thus forming a parallelogram in side view) as opposed to converging (trapezoidal in side view) as in FIG. 14. Also, the upper portion is longer, to allow room for the beam to reflect. This causes the incoming beam (140) to be bent upwards by refraction, reflecting off the upper surface (153) of the upper portion (151) by a process of total internal reflection, and then proceeds downward to the polarization separating interface (144) where the beams are split as described in FIG. 14, above. In this embodiment, the emergent beams (142) and (143) are automatically parallel to each other.

In the FIGS. 14 and 15 embodiments, since the polarization separation interface (144) is used at a large angle of incidence with possibly the same index of refraction material used on both sides of the interface (144), the design of the polarization separation coating of the interface (144) can be expected to be simplified.

Accordingly, it is to be understood that the embodiments of the invention herein described are merely illustrative of the application of the principles of the invention. Reference herein to details of the illustrated embodiments are not intended to limit the scope of the claims, which themselves recite those features regarded as essential to the invention. "Combining" can be understood as the reverse of "separating" —two parallel beams of orthogonal polarization can be combined into a single beam of mixed polarization. The description of such a combiner can be derived from the above descriptions of separators, by reversing the direction of propagation.

What is claimed is:

1. A polarization separator/combiner for separating a light beam comprising first and second components of orthogonal polarization into separate first and second light beams having substantially homogeneous and orthogonal polarization, or for combining separate first and second light beams having substantially homogeneous and orthogonal polarization into a single light beam comprising orthogonally polarized components, the separator/combiner comprising:

a first plate and a second plate, each plate comprising:
a first surface and a second surface, the first surface and the second surface being parallel, and spaced apart by the thickness of a transparent body therebetween,
the first surface having a coating applied thereto, such that the first surface forms a planar polarizing interface,
the coating being selected such that when a light beam having a first component having a first polarization and a second component having a second polarization orthogonal to the polarization of the first component strikes the first surface at a predetermined angle, the first component of light beam is substantially reflected by the coating, and the second component of the light beam is substantially transmitted through the coating;
the second surface of the plate forming a planar reflective interface;
such that the second component of light passes through the polarizing interface and through the transparent body of the plate, reflects off the reflective interface, and passes again through the polarzing interface, emerging parallel to the first light component,
the first plate being mounted parallel to the second plate and spaced apart therefrom, such that the first component and the second component pass from the first plate to the second plate without any optical components in the optical path between the first plate and the second plate which would effect the polarization of either the first component or the second component,
such that one of the first component and second component is reflected from the polarizing interface of the second plate to become parallel to the light beam, and the other component is transmitted through the polarizing interface of the second plate, reflects from the reflective interface of the second plate, and emerges through the polarization interface of the second plate, parallel to the light beam.

2. The polarization separator/combiner of claim 1 in which the polarizing interface of the second plate is selected such that the component light which reflects off the polarizing interface of the second plate is the same component which was transmitted through the polarizing interface of the first plate, and the other component which is transmitted through the polarizing interface of the second plate is the component which was reflected off the polarizing interface of the first plate.

3. A polarization separator/combiner for separating a light beam comprising first and second components of orthogonal polarization into separate first and second light beams having substantially homogeneous and orthogonal polarization, or for combining separate first and second light beams having substantially homogeneous and orthogonal polarization into a single light beam comprising orthogonally polarized components, the separator/combiner comprising:

a first plate and a second plate, each plate comprising:
a first surface and a second surface, the first surface and the second surface being parallel, and spaced apart by the thickness of a transparent body therebetween,
the first surface having a coating applied thereto, such that the first surface forms a planar polarizing interface,
the coating being selected such that when a light beam having a first component having a first polarization and a second component having a second polarization orthogonal to the polarization of the first component strikes the first surface at a predetermined angle, the first component of light beam is substantially reflected by the coating, and the second component of the light beam is substantially transmitted through the coating,
the second surface of the plate forming a planar reflective interface;
such that the second component of light passes through the polarizing interface and through the transparent body of the plate, reflects off the reflective interface, and passes again through the polarizing interface, emerging parallel to the first component,
the light beam entering the first plate along a first axis, and the first surface of the first plate being planar along a second axis orthogonal to the first axis,
the second plate being mounted at an angle to the first plate and spaced apart therefrom, such that the first component and the second component pass from the first plate to the second plate without any optical components in the optical path between the first plate and the second plate which would effect the polarization of either the first component or the second component, such that one of the first component and second component is reflected from the polarzing interface of the second plate in a direction which is orthogonal to the light beam along a third axis orthogonal to both the light beam and the first surface of the first plate, and the other component is transmitted through the polarizing interface of the second plate, reflects from the reflective interface of the second plate, and emerges through the polarization interface of the second plate parallel to the one component.

4. The polarization separator/combiner of claim 3 in which the polarizing interface of the second plate is selected such that the component which reflects off the polarizing interface of the second plate is the same component which was transmitted through the polarizing interface of the first plate, and the other component which is transmitted through the polarizing interface of the second plate is the component which was reflected off the polarizing interface of the first plate.

5. A walk-off device for separating an incoming light beam having components of mixed polarization into parallel first and second orthogonally polarized components comprising:

an upper section comprising a solid transparent body having a lower surface, and first and second end surfaces, planar polarizing interface means for separating the mixed polarization components of the incoming light beam, adjacent to the lower surface of the upper section;

the first end surface being at an angle to the incoming light beam passing therethrough, the angle being selected such that the incoming light beam is displaced by refraction into the planar polarizing interface;

the planar polarizing interface being constructed such that a first component is substantially reflected from the interface and a second orthogonally polarized component is substantially transmitted through the interface, the polarizing interface comprising an input side through which the light beam enters and an output side through which the second component is transmitted;

a planar reflective interface spaced apart from the output side of the polarizing interface;

such that the second component of light is transmitted through the polarizing interface, reflects off the reflective interface, and passes again through the polarizing interface into the upper section; and the second end surface of the upper section being at an angle to the first and second orthogonally polarized components, the angle being selected such that the first and second orthogonally polarized components are refracted to leave the upper section approximately parallel to each other and approximately parallel to the incoming beam.

6. The walk-off device of claim 5, in which the upper section further comprises an upper surface, and the first end surface of the upper section is at an angle to the incoming beam chosen such that the incoming beam is refracted toward the upper surface of the upper section and is then reflected from the upper surface toward the lower surface of the upper section.

7. The walk-off device of claim 5, in which the upper section further comprises an upper surface, and the upper surface and lower surface and first end surface and second end surface of the upper section form a parallelogram.

8. The walk-off device of claim 5, in which the upper section further comprises an upper surface, and the upper surface and lower surface and first end surface and second end surface of the upper section form a trapezoid.

9. The walk-off device of claim 5, in which the planar reflective interface comprises a plate having a transparent upper surface and a reflective lower surface, mounted below the upper section with the polarizing interface being sandwiched between the plate and the upper section.

10. The walk-off device of claim 9, in which the reflective lower surface of the plate comprises a reflective coating.

* * * * *